R. R. SMITH.
PIPE CUTTER AND GROOVER.
APPLICATION FILED MAR. 24, 1916.
1,199,438.
Patented Sept. 26, 1916.
2 SHEETS—SHEET 1.
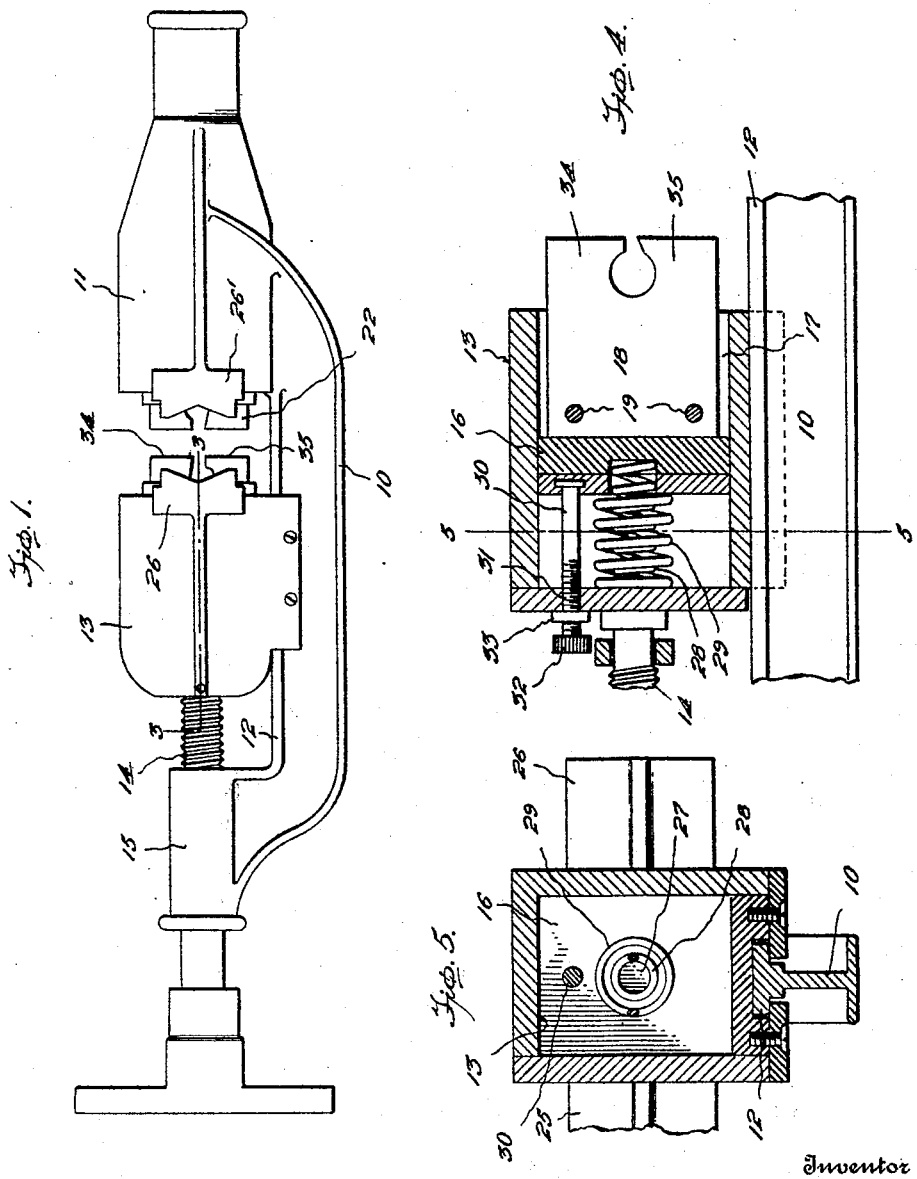
Inventor
Ray R. Smith.

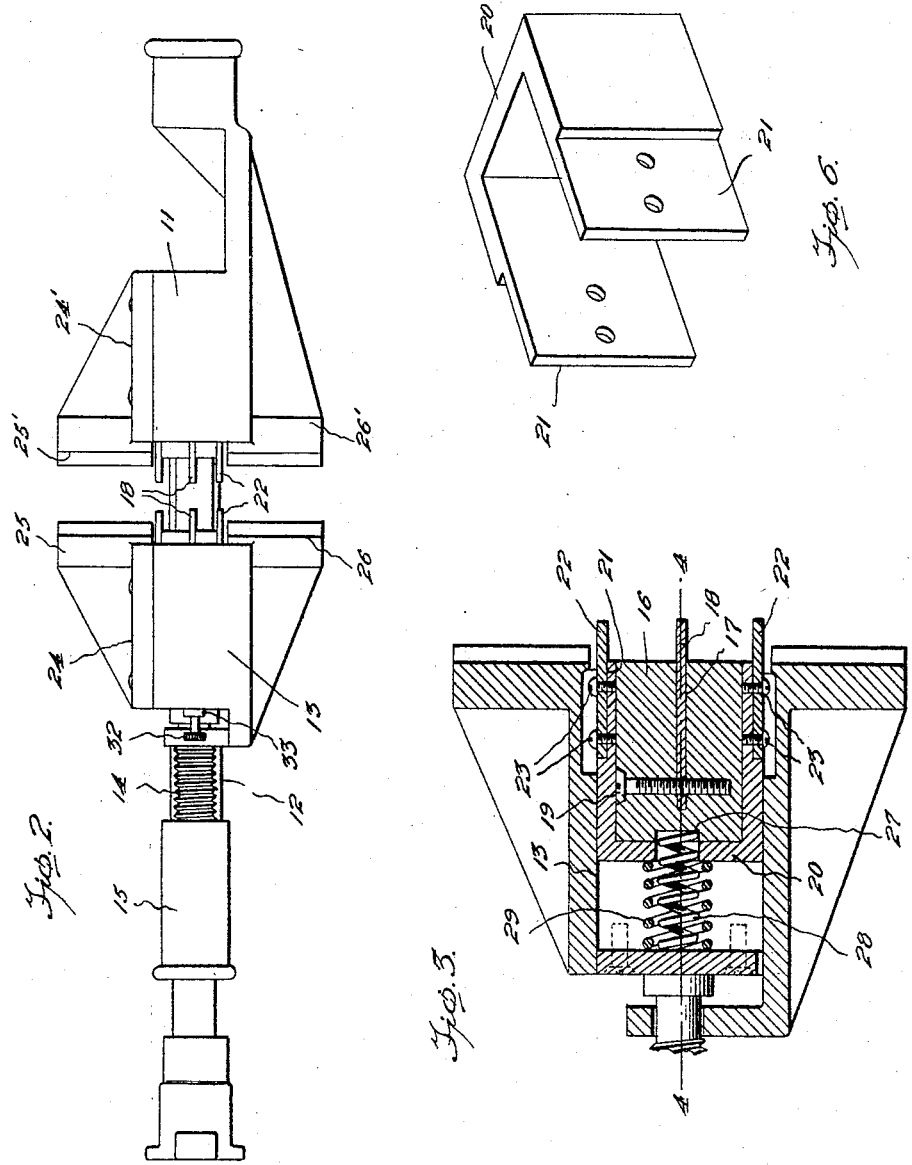

UNITED STATES PATENT OFFICE.

RAY R. SMITH, OF CLARKSBURG, WEST VIRGINIA.

PIPE CUTTER AND GROOVER.

1,199,438.   Specification of Letters Patent.   Patented Sept. 26, 1916.

Application filed March 24, 1916. Serial No. 86,453.

*To all whom it may concern:*

Be it known that I, RAY R. SMITH, a citizen of the United States, residing at Clarksburg, in the county of Harrison and State of West Virginia, have invented certain new and useful Improvements in Pipe Cutters and Groovers, of which the following is a specification, reference being had therein to the accompanying drawing.

My present invention relates to improvements in pipe cutters and groovers, one object of the invention being the provision of a tool which will operate to produce two grooves and at the same time cut a pipe to form two meeting flush faces, said tool being especially adapted to operate upon pipe sections shown in connection with my pipe coupling, set forth in a co-pending application filed even date herewith.

A further object of this invention is the provision of a cutter and groover having two grooving cutters controlled independently of the pipe cutting cutter so that during the operation of the tool two grooves will be formed, one upon each side of the cut, while the two sections will be severed, the depth of the groove being regulated so that regardless of the severing of the sections, these are unaffected.

A still further object of this invention is the provision of a device of this character which will grip both sections of the pipe and retain them in position until the same are grooved and severed, thus preventing any breakage at the cut that would impair the meeting faces of the sections when connected together by my coupling heretofore mentioned.

In the accompanying drawings:—Figure 1 is a side elevation of the complete tool. Fig. 2 is a view in elevation taken at right angles to that shown in Fig. 1. Fig. 3 is a section taken on line 3—3 of Fig. 1. Fig. 4 is a section taken on line 4—4 of Fig. 3. Fig. 5 is a section taken on line 5—5 of Fig. 4. Fig. 6 is a perspective view of the groove cutter carrying member.

Referring to the drawings, the numeral 10 designates the frame of the tool which is provided at one end with the fixed casing 11 and with the trackway 12 for carrying the slidable carriage or casing 13 which in turn is manipulated through the hand screw 14 mounted in the sleeve 15. As the respective casings 11 and 13 are provided with the identical form of cutting members, the description of one will suffice for both.

Mounted for sliding movement within the casing 13 is a block 16 which has removably mounted in the groove 17 the pipe cutter 18 which is provided for severing the pipe sections, a screw 19 being employed to lock the same in place. This block 16 is adapted to be bodily removed when it is necessary to insert or remove the cutter.

Adapted to fit astride of the block 16 is the yoke or frame 20 which is provided with the reduced terminals 21 for the reception of the groove cutters 22 secured thereto by the removable screws 23. Thus when it is desired to have access to the cutters 18 and 22, it is merely necessary to remove the respective plates 24 and 24' of the casings 13 and 11. These plates 24 and 24' are each provided with the pipe clamps 25 and 25', while at the opposite side of the frame 10 are provided the pipe clamps 26 and 26', thus permitting both sections of the pipe to be gripped at opposite sides of the cutters and whereby sections are held in place until completely severed.

The block 16 is provided with a socket 27 for the reception of the internal coil spring 28 which fits within the casing 13 and normally holds the block 16 toward the work acted upon. Surrounding this spring is an external spring 29 which engages the yoke 20 and thus acts upon the cutters 22 in a similar manner.

Connected to the yoke 20 are the two pins 30 which are threadedly engaged as at 31 to the casing and manipulated through the milled heads 32 so as to move the yoke 20 relatively to the block 16 so that the cutters 22 may be adjusted for cutting various depths of grooves or be retracted far enough to not engage the pipe so that the cutter 18 is the only active member. A lock nut 33 is provided for locking the pins 30 in any of these adjusted positions.

The cutters here shown are each provided with the guiding portion 34 and the cutting portion 35 so that the grooves and cut on the pipe section are uniform and the distance of projection in the grooves is limited.

From the foregoing description it is evident with a tool of this character that a section of pipe may be operated upon to produce two sections with flush meeting ends and with circumferential grooves of varying depths according to the adjustments of the frame 20, thus especially adapting the present tool for use in connection with my pipe coupling above mentioned. It is also apparent that by manipulating the frame 20 so that the cutters 22 do not engage the pipe, that the cutter 18 will be the only active member in the present tool, a combination that is handy for cutting pipe as well as cutting and grooving them simultaneously.

What I claim as new is:—

1. In a tool of this character, a frame having a trackway and a fixed cutter casing, a carriage forming a movable cutter casing mounted upon the trackway, a feed screw for manipulating the carriage, a yoke slidably mounted in each casing, a block mounted in said yoke, a plurality of cutters carried by the yoke and block, and independent springs for yieldingly engaging the yoke and block respectively.

2. In a tool of the character described, a frame having a fixed casing with oppositely disposed pipe clamping members, a traveling casing mounted upon the frame and having coöperating oppositely disposed pipe clamping members, a feed screw for actuating said casing, a cutter carrying block slidably mounted in each casing, a yoke slidably fitting upon said block, the terminal ends of which are reduced, a cutter mounted in the block, and two cutters, one connected to each reduced terminal of the yoke, and two springs operating independently upon the block and yoke.

3. In a tool of the character described, a frame having a trackway and a fixed cutter casing, a carriage forming a movable cutter casing mounted upon the trackway, a feed screw for manipulating the carriage, a yoke slidably mounted in each casing, a block mounted in said yoke, a plurality of cutters carried by the yoke and block, independent springs for yieldingly engaging the yoke and block respectively, and adjusting means for actuating the yoke to regulate the depth of these cutters and for retracting the same out of work engagement.

4. In a tool of the character described, a frame having a fixed casing with oppositely disposed pipe clamping members, a traveling casing mounted upon the frame and having coöperating oppositely disposed pipe clamping members, a feed screw for actuating said casing, a yoke slidably fitting upon said block, the terminal ends of which are reduced, a cutter mounted in the block, two cutters, one connected to each reduced terminal of the yoke, two springs operating independently upon the block and yoke, and adjusting means for actuating the yoke to regulate the depth of these cutters and for retracting the same out of work engagement.

5. A tool of this character having a casing, a yoke slidably mounted in said casing and having reduced terminals, a cutter removably attached to each reduced terminal, said yoke having an opening through the cutting portion thereof, a block disposed within said yoke, a cutter carried by said block, said cutters being arranged to cut in parallel, a spring mounted in the casing and through the opening of the yoke to engage the block to resiliently operate upon the same, and a surrounding spring mounted in the casing and engaging the yoke and operating in the same direction as the first spring.

6. A tool of this character having a casing, a yoke slidably mounted in said casing and having reduced terminals, a cutter removably attached to each reduced terminal, said yoke having an opening through the connecting portion thereof, a block disposed within said yoke, a cutter carried by said block, said cutters being arranged to cut in parallel, a spring mounted in the casing and through the opening of the yoke to engage the block to resiliently operate upon the same, a surrounding spring mounted in the casing and engaging the yoke and operating in the same direction as the first spring, and manually adjusted means mounted in the casing and engaging the yoke for retracting and projecting the yoke to regulate the depth of cut and for moving the cutters out of work engagement.

7. In a tool of this character, a frame having a trackway and a fixed cutter casing, a carriage forming a movable cutter casing mounted upon the trackway, a feed screw for manipulating the carriage, a yoke slidably mounted in each casing, a block mounted in said yoke, and a plurality of cutters carried by the yoke and block respectively.

In testimony whereof I affix my signature.

RAY R. SMITH.

Copies of this patent may be obtained for five cents each, by addressing the "Commissioner of Patents, Washington, D. C."